US008526972B2

(12) United States Patent
Takami et al.

(10) Patent No.: US 8,526,972 B2
(45) Date of Patent: Sep. 3, 2013

(54) SERVER APPARATUS, INFORMATION PROVIDING PROGRAM, RECORDING MEDIUM RECORDING INFORMATION PROVIDING PROGRAM, INFORMATION PROVIDING METHOD, PORTABLE TERMINAL DEVICE, TERMINAL PROCESSING PROGRAM, RECORDING MEDIUM RECORDING TERMINAL PROCESSING PROGRAM, AND INFORMATION PROVIDING SYSTEM

(75) Inventors: Shinya Takami, Shinagawa-ku (JP); Keisuke Matsuo, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/510,169

(22) PCT Filed: Jan. 26, 2011

(86) PCT No.: PCT/JP2011/051465
§ 371 (c)(1),
(2), (4) Date: May 16, 2012

(87) PCT Pub. No.: WO2011/093322
PCT Pub. Date: Aug. 4, 2011

(65) Prior Publication Data
US 2012/0231818 A1 Sep. 13, 2012

(30) Foreign Application Priority Data
Jan. 27, 2010 (JP) .................................. 2010-015875

(51) Int. Cl.
*H04W 24/00* (2009.01)

(52) U.S. Cl.
USPC ................. 455/456.3; 455/456.1; 455/456.2; 455/456.4; 455/456.5; 455/456.6

(58) Field of Classification Search
USPC ........................................... 455/456.1–456.6
See application file for complete search history.

(56) References Cited

U.S. PATENT DOCUMENTS
2006/0020373 A1   1/2006   Abe

FOREIGN PATENT DOCUMENTS

| JP | 2001-156902 A | 6/2001 |
| JP | 2001-336948 A | 12/2001 |
| JP | 2003-141406 A | 5/2003 |
| JP | 2005-337997 A | 12/2005 |
| JP | 2006-029885 A | 2/2006 |
| JP | 2009-168567 A | 7/2009 |
| JP | 2009-217553 A | 9/2009 |

*Primary Examiner* — Olumide T Ajibade Akonai
*Assistant Examiner* — Edward Zhang
(74) *Attorney, Agent, or Firm* — Sughrue Mion, PLLC

(57) ABSTRACT

Provided are a server apparatus, an information providing program, an information providing method, and an information providing system, capable of effectively acquiring information regarding facilities, etc., which are located in an approximate direction from the current position of a user, even in the case that a destination is not determined. When the server apparatus receives, from the portable terminal device, position information, direction information, and an information acquisition request which have been acquired by the portable terminal device, the server apparatus determines an information extraction range on the basis of the position information and the direction information. Then, the server apparatus extracts provision information corresponding to a position located within the determined information extraction range, and provides the provision information to the portable terminal device.

25 Claims, 6 Drawing Sheets

(B)

(A)

SERVER APPARATUS, INFORMATION PROVIDING PROGRAM, RECORDING MEDIUM RECORDING INFORMATION PROVIDING PROGRAM, INFORMATION PROVIDING METHOD, PORTABLE TERMINAL DEVICE, TERMINAL PROCESSING PROGRAM, RECORDING MEDIUM RECORDING TERMINAL PROCESSING PROGRAM, AND INFORMATION PROVIDING SYSTEM

CROSS-REFERENCE TO RELATED APPLICATIONS

This application is a National Stage of International Application No. PCT/JP2011/051465 filed Jan. 26, 2011, claiming priority based on Japanese Patent Application No. 2010-015875, filed Jan. 27, 2010, the contents of all of which are incorporated herein by reference in their entirety.

TECHNICAL FIELD

The present invention relates to a technical field of an information providing system including a portable terminal device and a server apparatus to which the portable terminal device is accessible via a communication means.

BACKGROUND ART

There is conventionally known a technique in which a terminal used by a user acquires useful information of electronic coupons of surrounding facilities based on position information. For example, Patent Document 1 discloses therein a technique for acquiring an electronic coupon of an actually-nearest facility from a user's current position. Patent Document 2 discloses therein a technique for acquiring an electronic coupon included in a circular range with reference to a user's current position. Further, Patent Document 3 discloses therein a technique in which a navigation system main body incorporated in a vehicle acquires an electronic coupon of a souvenir shop existing at a destination place or along a road.

CITATION LIST

Patent Document

Patent Document 1: Japanese Patent Application Laid-Open No. 2003-141406
Patent Document 2: Japanese Patent Application Laid-Open No. 2009-217553
Patent Document 3: Japanese Patent Application Laid-Open No. 2009-168567

SUMMARY OF INVENTION

Problem to be Solved by Invention

However, the prior arts disclosed in Patent Documents 1 and 2 were complicated since a range in which information of an electronic coupon is to be acquired is an omnidirectional range with reference to a user's current position and thus user-undesired information is acquired.

In the prior arts, for example, when a user at a shop wants to move to another shop, the user needs to confirm a distance between the shops by displaying a map on the terminal for searching the another shop, which was complicated.

In the prior arts, for example, when a user searches a shop existing in a rough direction and within a rough distance from his/her current position, it was difficult to efficiently acquire information on the shop.

On the other hand, in the conventional technique disclosed in Patent Document 3, an information acquisition range can be limited to shops existing at a destination place or along a road, but it was difficult to efficiently acquire the information on the shops when a destination place is not determined.

The present invention has been made in terms of the above problems, and its exemplary object is to provide a server apparatus, an information providing program, a recording medium recording the information providing program therein, an information providing method, a portable terminal device, a terminal processing program, a recording medium recording the terminal processing program therein, and an information providing system capable of efficiently acquiring information of facilities, etc., which exist in a rough direction from a user's current position even when a destination place is not determined.

Means for Solving Problem

In order to achieve above problem, an invention described in claim 1, comprises an information acquisition request receiving means that receives position information indicating a position of a portable terminal device, direction determination information used for determining a direction in which a user of the portable terminal device desires to acquire information, and an information acquisition request from the portable terminal device via a communication means; an information extraction range determining means that determines an information extraction range based on the received position information and the direction determination information; a provision information extracting means that extracts provision information corresponding to a position within the determined information extraction range from a provision information storing means that stores the provision information to be provided to the user of the portable terminal device in association with position information; and a provision information transmitting means that transmits the extracted provision information to the portable terminal device having made the information acquisition request via the communication means. According to this invention, even when a destination place is not determined by a user of a portable terminal device, the portable terminal device can efficiently acquire and present provision information of facilities, etc., which exist in a rough (approximate) direction from a user's current position to the user.

An invention described in claim 2, has features that in the server apparatus described in claim 1, the information acquisition request receiving means receives direction information indicating a direction in which a reference position of the portable terminal device faces as the direction determination information from the portable terminal device via a communication means, and the information extraction range determining means determines an information extraction range based on the received position information and the direction information.

An invention described in claim 3, has features that in the server apparatus according to claim 1 or 2, the information acquisition request receiving means receives distance determination information used for determining a distance between the portable terminal device and a predetermined point within the information extraction range from the portable terminal device, and the information extraction range determining means determines an information extraction range based on the received position information, the direction determination information and the distance determination information. According to this invention, even when a destination place is not determined by a user, the portable terminal device can efficiently acquire and present provision information of facilities, etc., which exist in a rough direction and within a rough distance from a user's current position to the user.

An invention described in claim 4, in the server apparatus according to any one of claims 1 to 3, further comprises an information extraction range changing means that changes a size of the information extraction range based on the number of items of providing information corresponding to a position within the information extraction range. According to this invention, the number of items of provision information to be presented to the user can be adjusted to be proper.

An invention described in claim 5, has features that in the server apparatus according to claim 3 or 4, the information acquisition request receiving means receives acceleration information indicating an acceleration specified in the portable terminal device as the distance determination information from the portable terminal device, and the information extraction range determining means determines an information extraction range based on the received position information, the direction determination information and the acceleration information.

An invention described in claim 6, has features that in the server apparatus according to claim 5, wherein the information acquisition request receiving means receives second acceleration information indicating a second acceleration specified in the portable terminal device from the portable terminal device within a predetermined time after an initial acceleration is specified in the portable terminal device, and the information extraction range determining means further determines the information extraction range based on the received second acceleration information. According to this invention, the user can arbitrarily adjust an information extraction range based on a speed at which the portable terminal device is shaken.

An invention described in claim 7, has features that in the server apparatus according to claim 6, a direction of the initial acceleration is different from a direction of the second acceleration. According to this invention, the user can arbitrarily adjust the information extraction range based on two directions in which the portable terminal device is easily shaken without difficulty.

An invention described in claim 8, has features that in the server apparatus according to any one of claims 5 to 7, in which the information acquisition request receiving means receives area information on an area displayed on a displaying unit in the portable terminal device from the portable terminal device, further comprises a maximum acceleration setting means that sets a maximum value of an acceleration to be specified; and a maximum distance setting means that sets a maximum value of a distance, which is to be determined based on the acceleration information, based on the area information, wherein the information element determining means determines a distance corresponding to an acceleration indicated in the received acceleration information based on the set maximum value of the acceleration and the set maximum value of the distance. According to this invention, the user can search a facility within an area range currently-displayed on the portable terminal device, and can browse the provision information.

An invention described in claim 9, has features that in the server apparatus according to any one of claims 1 to 8, the providing information includes attribute information, the information acquisition request receiving means receives attribute information designated by the user in the portable terminal device from the portable terminal device, and the providing information extracting means extracts the providing information including the received attribute information from the providing information storing means. According to this invention, the user can arbitrarily designate an attribute of user's desired provision information to be browsed.

An invention described in claim 10, is an information providing program (computer-readable program) for causing a computer to function as: an information acquisition request receiving means that receives position information indicating a position of a portable terminal device, direction determination information used for determining a direction in which a user of the portable terminal device desires to acquire information, and an information acquisition request from the portable terminal device via a communication means; an information extraction range determining means that determines an information extraction range based on the received position information and the direction determination information; a providing information extracting means that extracts providing information corresponding to a position within the determined information extraction range from a providing information storing means that stores the providing information to be provided to the user of the portable terminal device in association with position information; and a providing information transmitting means that transmits the extracted providing information to the portable terminal device having made the information acquisition request via the communication means.

An invention described in claim 11, is a recording medium recording an information providing program for causing a computer to function as: an information acquisition request receiving means that receives position information indicating a position of a portable terminal device, direction determination information used for determining a direction in which a user of the portable terminal device desires to acquire information, and an information acquisition request from the portable terminal device via a communication means; an information extraction range determining means that determines an information extraction range based on the received position information and the direction determination information; a providing information extracting means that extracts providing information corresponding to a position within the determined information extraction range from a providing information storing means that stores the providing information to be provided to the user of the portable terminal device in association with position information; and a providing information transmitting means that transmits the extracted providing information to the portable terminal device having made the information acquisition request via the communication means.

An invention described in claim 12, comprises a step of, at a server apparatus, receiving position information indicating a position of a portable terminal device, direction determination information used for determining a direction in which a user of the portable terminal device desires to acquire information, and an information acquisition request from the portable terminal device via a communication means; a step of, at the server apparatus, determining an information extraction range based on the received position information and the direction determination information; a step of, at the server apparatus, extracting providing information corresponding to a position within the determined information extraction range from a providing information storing means that stores the providing information to be provided to the user of the portable terminal device in association with position information; and a step of, at the server apparatus, transmitting the extracted providing information to the portable terminal device having made the information acquisition request via the communication means.

An invention described in claim 13, comprises a portable terminal device and a server apparatus to which the portable terminal device is accessible via a communication means, wherein the portable terminal device comprises: a position information acquiring means that acquires position information indicating a position of the portable terminal device; a direction information acquiring means that acquires direction determination information used for determining a direction in which a user of the portable terminal device desires to acquire information; and an information acquisition request transmitting means that transmits the acquired position information, the direction determination information and the information acquisition request to the server apparatus via a communication means, and the server apparatus comprises: an information acquisition request receiving means that receives the transmitted position information, the direction determination information and the information acquisition request; an information extraction range determining means that determines an information extraction range based on the received position information and the direction determination information; a providing information extracting means that extracts providing information corresponding to a position within the determined information extraction range from a providing information storing means that stores the providing information to be provided to the user of the portable terminal device in association with position information; and a providing information transmitting means that transmits the extracted providing information to the portable terminal device having made the information acquisition request via the communication means.

An invention described in claim 14, has features that in the information providing system according to claim 13, wherein the information acquisition request receiving means receives direction information indicating a direction in which a reference position of the portable terminal device faces as the direction determination information from the portable terminal device via a communication means, and the information extraction range determining means determines an information extraction range based on the received position information and the direction information.

An invention described in claim 15, has features that in the information providing system according to claim 13 or 14, the information acquisition request transmitting means receives distance determination information used for determining a distance between the portable terminal device and a predetermined point within the information extraction range from the portable terminal device, and the information extraction range determining means determines an information extraction range based on the received position information, the direction determination information and the distance determination information.

An invention described in claim 16, comprises an information acquisition request transmitting means that transmits position information indicating a position of a portable terminal device, direction determination information used for determining a direction in which a user of the portable terminal device desires to acquire information, and an information acquisition request to a server apparatus via a communication means; a receiving means that receives an information element transmitted from the server apparatus in response to the information transmitted by the information acquisition request transmitting means; and a displaying means that displays the received information element.

An invention described in claim 17, has features that in the portable terminal device according to claim 16, the information acquisition request transmitting means transmits direction information indicating a direction in which a reference position of the portable terminal device faces as the direction determination information to the server apparatus. An invention described in claim 18, has features that in the portable terminal device according to claim 16 or 17, the information acquisition request transmitting means transmits distance determination information used for determining a distance up to a predetermined point within a range in which the server apparatus extracts information to the server apparatus.

An invention described in claim 19, is a terminal processing program for causing a computer included in a portable terminal device to function as: an information acquisition request transmitting means that transmits position information indicating a position of the portable terminal device, direction determination information used for determining a direction in which a user of the portable terminal device desires to acquire information, and an information acquisition request to the server apparatus via a communication means; a receiving means that receives an information element transmitted from the server apparatus according to the transmitted information; and a displaying means that displays the received information element.

An invention described in claim 20, is a recording medium recording terminal processing program for causing a computer included in a portable terminal device to function as: an information acquisition request transmitting means that transmits position information indicating a position of the portable terminal device, direction determination information used for determining a direction in which a user of the portable terminal device desires to acquire information, and an information acquisition request to the server apparatus via a communication means; a receiving means that receives an information element transmitted from the server apparatus according to the transmitted information; and a displaying means that displays the received information element.

Effect of Invention

According to present invention, even when a destination place is not determined by a user of a portable terminal device, the portable terminal device can efficiently acquire and present provision information of facilities, etc., which exist in a rough direction from a user's current position.

EMBODIMENT OF INVENTION

An embodiment of the present invention will be described below in detail with reference to the drawings. The embodiment described later is when the present invention is applied to an information providing system.

[1. Outlines of Configuration and Functions of Information Providing System]

A configuration and schematic functions of an information providing system S according to the present embodiment will be described first with reference to FIG. 1.

Figure 1:
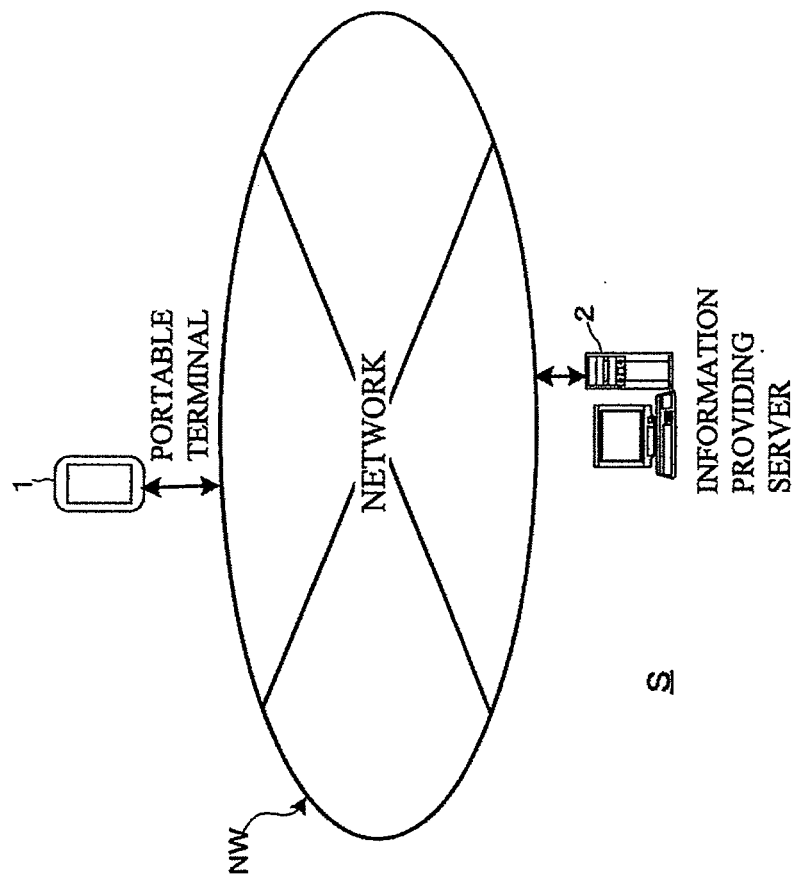
FIG. 1 is a diagram showing an exemplary schematic configuration of the information providing system S according to the present embodiment.

FIG. 1 is a diagram showing an exemplary schematic configuration of the information providing system S according to the present embodiment.

As shown in FIG. 1, the information providing system S includes a portable terminal 1, and an information providing server 2 to which the portable terminal 1 is accessible via a network NW as a communication means. The portable terminal 1 is an exemplary portable terminal device according to the present invention. The information providing server 2 is an exemplary server apparatus.

The portable terminal 1 and the information providing server 2 can exchange data with each other via (through) the network NW. The network NW is constructed of Internet, a dedicated communication line (for example, CATV (Community Antenna Television) line), a mobile communication network (including base stations), and a gateway, for example.

[1-1. Outlines of Configuration and Functions of Portable Terminal 1]

Figure 2:
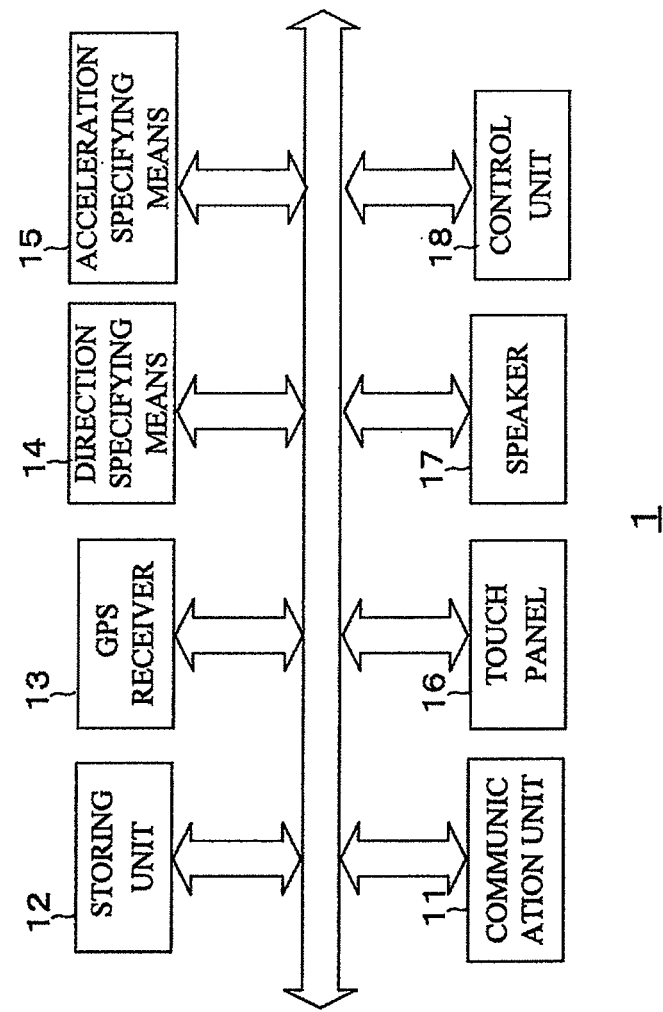
FIG. 2 is a block diagram showing an exemplary schematic configuration of the portable terminal 1.

FIG. 2 is a block diagram showing an exemplary schematic configuration of the portable terminal 1.

As shown in FIG. 2, the portable terminal 1 includes a communication unit 11, a storing unit 12, a GPS (Global Positioning System) receiver 13, a direction specifying means 14, an acceleration specifying means 15, a touch panel 16 as exemplary displaying unit and operating means, a speaker 17 and a control unit 18. The portable terminal 1 is applicable to a cell phone (mobile phone), a PDA, and a portable game player, etc., for example.

The storing unit 12 is configured of a flash memory, etc., for example, and stores therein an OS (operating system) and various application programs (including a terminal processing program according to the present invention). The terminal processing program according to the present invention may be acquired from other server apparatus via the network NW or may be recorded in a recording medium and read via a drive device.

The GPS receiver 13 receives a navigation radio wave output from a GPS satellite via an antenna and detects a current position (longitude and latitude, for example) of the portable terminal 1.

The direction specifying means 14 specifies a direction in which the portable terminal 1 faces. The direction in which the portable terminal 1 faces means a direction (orientation) in which a reference position of the portable terminal 1 faces. The direction in which the reference position of the portable terminal 1 faces can be determined based on a tilt of the portable terminal 1. For example, the tilt of the portable terminal 1 is a tilt of an axis connecting two arbitrary points recognized by the direction specifying means 14. In this case, one point of the two points at a higher position from the ground is assumed as the reference position and a direction of the reference position relative to the other point is a direction in which the reference position of the portable terminal 1 faces. The tilt is calculated based on a gravity acceleration detected by the direction specifying means 14. The tilt of the portable terminal 1 may be a tilt when a parallel component to the portable terminal 1 is assumed as an axis while the gravity acceleration is separated into the parallel component and a vertical component of the portable terminal 1. When vertical/horizontal detection is possible based on the tilt of the portable terminal 1, the positions of the two points may be changed (that is, the reference position is changed) depending on the vertical and horizontal detection result. For example, when the user of the portable terminal uses the portable terminal while the horizontal axis of the portable terminal 1 is horizontal relative to the ground, the axis connecting the two points is determined to be parallel to the vertical axis of the portable terminal 1, and one point at a higher position from the ground is assumed as a reference position, for example. The direction specifying means is well known as a digital compass, etc., for example, and a detailed explanation thereof will be omitted. The acceleration specifying means 15 specifies an acceleration in the portable terminal 1. For the means for specifying an acceleration, the acceleration can be specified by use of a well-known acceleration sensor such as a semiconductor acceleration sensor including a triaxial acceleration sensor, an optical acceleration sensor for specifying an acceleration by analyzing a video captured by a camera in units of time, or a mechanical acceleration sensor including a tilt sensor. For example, the triaxial acceleration sensor can specify the acceleration of the portable terminal 1 at 0 to 4.0 (at 0.1 second interval). The acceleration specifying means may specify a speed based on the position information of multiple terminals per predetermined detection time and an interval of the detection time, and may specify an acceleration based on the speed and the interval of the detection time.

The control unit 18 has a CPU, a RAM, and a ROM, for example. The CPU executes an application program under the execution of the OS so that the control unit 18 functions as position information acquiring means, direction information acquiring means, acceleration information acquiring means, and information acquisition request transmitting means. Specifically, the control unit 18 activates the application program (which will be called "application activation" below) for accessing the information providing server 2 to access (connect to) the information providing server 2 via the communication unit 11. The control unit 18 acquires position information indicating a current position detected by the GPS receiver 13 from the GPS receiver 13. The control unit 18 acquires direction information indicating a direction specified by the direction specifying means 14 from the direction specifying means 14. A timing when the control unit 18 determines a direction indicated in the direction information to be transmitted to the information providing server 2 may be (i) a timing when a maximum acceleration is specified, (ii) a timing when an initial acceleration is detected, (iii) a timing when an acceleration is not detected, or (iv) a timing when the user operates an information acquisition request button, etc., for example. The direction information is exemplary direction determination information used for determining a direction in which the user of the portable terminal 1 desires to acquire information with reference to a current position. Other exemplary direction determination information may be first position information indicating a first position (start point) detected by the GPS receiver 13 and second position information indicating a second position (end point) detected after the detection of the first position. In this case, the direction in which the information is desired to acquire is determined by the information providing server 2. The direction determination information may indicate a direction designated on the touch panel 16 by the user of the portable terminal 1.

The control unit 18 acquires acceleration information indicating an acceleration specified by the acceleration specifying means 15 from the acceleration specifying means 15. The acceleration information is exemplary distance determination information used for determining a distance from the portable terminal 1 to a predetermined point (information acquisition point) within an information extraction range described later. The distance up to a predetermined point within the information extraction range can be determined based on the acceleration detected in the portable terminal 1 as described later, but there may be configured such that information for calculating an acceleration is transmitted from the portable terminal 1 to the information providing server 2 instead of the acceleration information and an acceleration is calculated in the information providing server 2. For example, there may be configured such that the first position information, the second position information, first time (when the control unit 18 acquires the first position information) information corresponding to the first position, and second time (when the control unit 18 acquires the second position information) information corresponding to the second position (end point) are transmitted as the distance determination information (information overlapping with the direction determination information is excluded) to the information providing server 2. The time is acquired by a clock function of the portable terminal 1. There may be configured such that time information indicating a period of time (calculated by the control unit 18) between the first time and the second time, instead of the first time information and the second time information, is transmitted as one item of distance determination information to the information providing server 2. There may be configured such that distance information indicating a distance (calculated by the control unit 18) between the first position and the second position, instead of the first position information and the second position information, is transmitted as one item of distance determination information to the information providing server 2. There may be configured such that speed information indicating a movement speed (calculated by the control unit 18) required for a movement between the first position and the second position, instead of the first position information and the second position information, is transmitted as one item of distance determination information to the information providing server 2. The distance determination information may indicate a distance designated on the touch panel 16 by the user of the portable terminal 1. The control unit 18 transmits the acquired position information (the first position information), the direction determination information (such as the direction information or the second position information), and an information acquisition request to the information providing server 2 via the network NW. Alternatively, the control unit 18 transmits the acquired position information (the first position information), the direction determination information (such as the direction information or the second position information), the distance determination information (such as the acceleration information, or the first time information and the second time information), and the information acquisition request to the information providing server 2 via the network NW. The providing information transmitted from the information providing server 2 in response to the information acquisition request is received by the control unit 18 and is displayed on the touch panel 16, for example.

[1-2. Outlines of Configuration and Functions of Information Providing Server 2]

Figure 3:
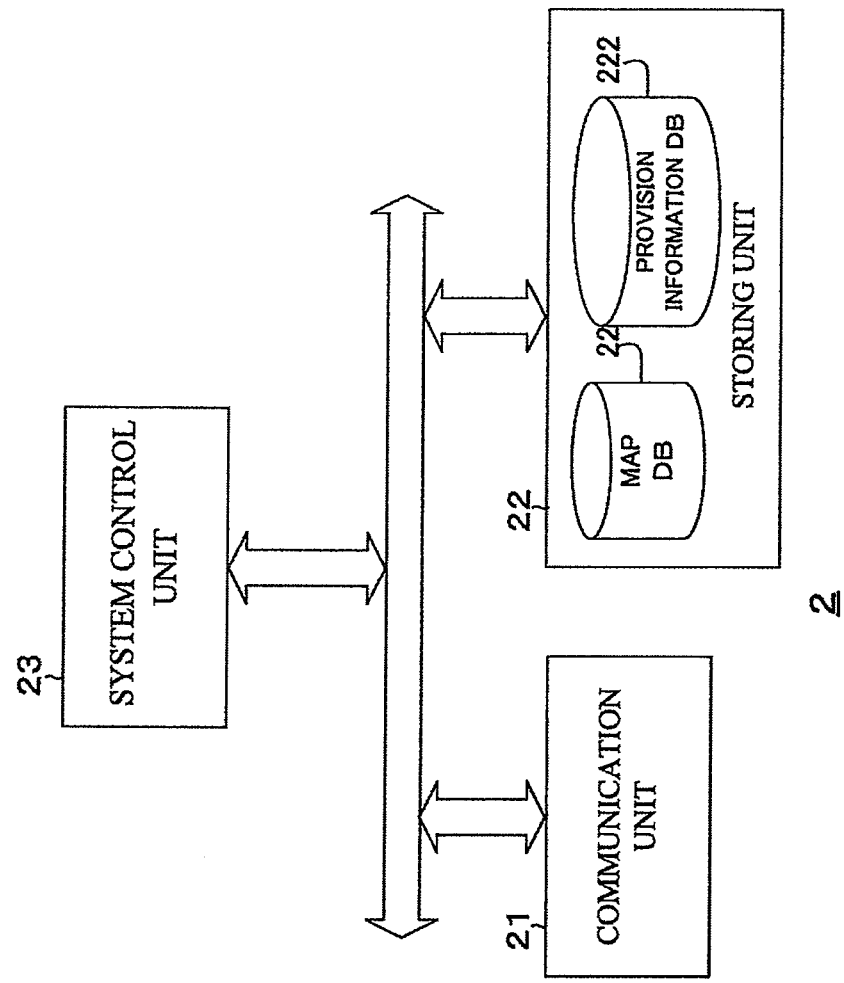
FIG. 3 is a block diagram showing an exemplary schematic configuration of the information providing server 2.

FIG. 3 is a block diagram showing an exemplary schematic configuration of the information providing server 2.

As shown in FIG. 3, the information providing server 2 includes a communication unit 21, a storing unit 22, a system control unit 23, and the like. The information providing server 2 may be configured of one server or groups of servers.

The storing unit 22 is configured of a hard disc drive, for example, and stores therein an OS, various programs (such as information providing program and Web server program according to the present invention), and various items of data. The information providing program according to the present invention may be acquired from other server apparatus via the network NW or may be recorded in a recording medium and read via a drive device, for example.

The storing unit 22 is configured of a map database (DB) 221 and a providing information database (DB) 222 (exemplary providing information storing means). The providing information database (DB) 222 (exemplary providing information storing means) may be provided inside the information providing server 2 or outside the information providing server 2.

The map database 221 registers map data indicating maps therein. The map data includes map image data indicating facilities, land reallocations, roads, rivers, sea, harbors and mountains, and information such as position information (longitude and latitude, for example), addresses and types of respective points on the map images.

Exemplary facilities include stores (such as shops, department stores and restaurants), accommodations, museums, zoos, amusement parks and the like. Exemplary point types include facility, land reallocation, road, river, sea, harbor, mountain and the like.

The providing information database 222 registers therein provision information to be provided to the user of the portable terminal 1 from an arbitrary point (such as facility) in association with position information (longitude and latitude, for example) of the point, for example. Exemplary provision information may include regional information, tourist information, accommodation information, shop information, coupon information and the like.

The regional information includes information on guidance, etc., of surrounding areas of a corresponding point. The tourist information includes information on guidance of sightseeing spots around a corresponding spot. The accommodation information includes information such as name, type, address, presence of vacant room, price, service contents, and room images of the accommodation existing at a corresponding point. The shop information includes therein information such as name, address, products' and services' contents (including product type and service type), prices of products and services, and shop images of the shop existing at a corresponding point. Exemplary product type includes food, clothes, books and the like. Exemplary service type includes dining, cafe, laundry and the like. When the shop is a restaurant, its shop information includes information on presence of vacant seats. The coupon information includes information such as name, address, products' or services' contents (including product type and service type) of the facility located at a corresponding point, cash voucher, discount voucher and complimentary ticket which are available in the facility. The information included in the provision information is exemplary attribute information used for keyword search.

The system control unit 23 is configured of a CPU, a ROM, a RAM and the like. The CPU reads and executes various programs stored in the ROM or the storing unit 22 so that the system control unit 23 functions as information acquisition request receiving means, information extraction range determining means, provision information extracting means, provision information transmitting means, information extraction range change means, maximum acceleration setting means, and maximum distance setting means. Specifically, when receiving the position information, the direction determination information (or the position information, or the direction determination information and the distance determination information), and the information acquisition request transmitted from the portable terminal 1 via the network NW and the communication unit 21 from the portable terminal 1, the system control unit 23 determines an information extraction range based on the received position information and the direction determination information (or the position information, or the direction determination information and the distance determination information), and extracts provision information corresponding to the position within the determined information extraction range from the provision information database 222. For example, the system control unit 23 determines a start point based on the received position information, determines a direction based on the received direction determination information (alternatively, determines a start point (position) based on the received position information, determines a direction based on the received direction determination information, and determines a distance based on the received distance determination information), determines an information extraction range based on the determined start point and direction (or the start point, the direction and the distance), and extracts provision information corresponding to the position in the determined information extraction range from the provision information database 222. The system control unit 23 transmits the extracted provision information to the portable terminal 1 having made the information acquisition request via the communication unit 21 and the network NW.

[2. Operations of Information Providing System]

The operations of the information providing system S according to the present embodiment will be described below with reference to FIG. 4.

Figure 4:
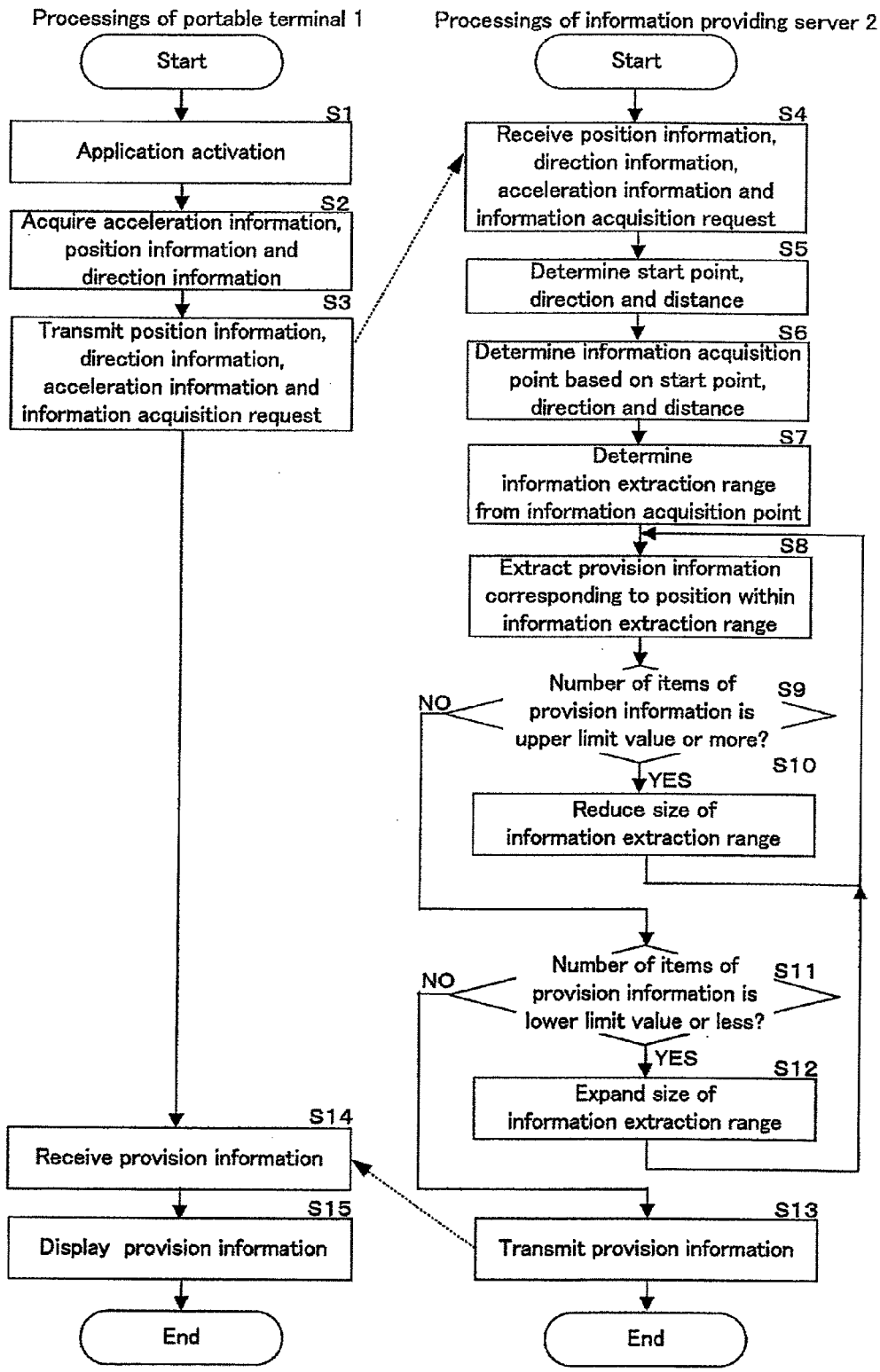
FIG. 4 is a sequence diagram showing the processings and the exchange of information between the portable terminal 1 and the information providing server 2.

FIG. 4 is a sequence diagram showing the processings and the exchange of information between the portable terminal 1 and the information providing server 2.

While the portable terminal 1, by the application activation (step S1), access the information providing server and is in a standby state for acquiring the acceleration information, etc., when the user shakes the portable terminal 1 toward certain direction at certain speed, the control unit 18 in the portable terminal 1 acquires the acceleration information indicating an acceleration specified by the acceleration specifying means 15 (such as an acceleration specified by shaking the portable terminal 1), the position information indicating a current position detected by the GPS receiver 13, and the direction information indicating a direction specified by the direction specifying means 14 (such as a direction in which the reference position of the portable terminal 1 faces) (step S2). For example, when desiring to search a facility relatively close to the current position in a direction, the user slowly shakes the portable terminal 1 in the direction. On the other hand, for example, when desiring to search a facility relatively distant from the current position in a direction, the user quickly shakes the portable terminal 1 in the direction. For example, we may have an image that when a fisherman wants to throw a hook with a fishing bait on the tip of the fishing line leading to the fishing rod far, he/she quickly shakes the fishing rod ahead.

When the user contacts the "information acquisition request button" displayed on the touch panel 16, for example (alternatively, a predetermined time (1 second, for example) has passed since the acceleration information was acquired), the control unit 18 transmits the acquired position information, the direction information, the acceleration information and the information acquisition request to the information providing server 2 via the network NW (step S3). Herein, the transmission timings of the position information, the direction information, the acceleration information and the information acquisition request may not be at the same time. When the user shakes the portable terminal 1 in a different direction (such as a reverse direction) from the direction in which the initial acceleration is specified within a predetermined time (2 seconds, for example) after the initial acceleration is specified in the portable terminal 1 (for example, after the acceleration information indicating the initial acceleration specified by shaking the portable terminal 1 is acquired), and thus the control unit 18 acquires the second acceleration information indicating a second acceleration specified in the portable terminal 1, the portable terminal transmits the acquired position information, the direction information, the acceleration information and the information acquisition request to the information providing server 2 via the network NW. At this time, the control unit 18 may transmit the acquired second acceleration information in addition to the acquired acceleration information to the information providing server 2 (transmit together with the information acquisition request or transmit after the information acquisition request was transmitted). We may have an image that a fisherman quickly shakes the fishing rod backward for catching the tug of the fishing rod, for example.

While the portable terminal 1 is in the standby state for acquiring the acceleration information or the like, the control unit 18 displays a designation column for designating desired attribute information on the touch panel 16, and stores attribute information designated by user's inputting or selecting desired attribute information in the designation column (for example, selecting from a selection candidate list). When acquiring the acceleration information or the like, the control unit 18 may transmit the designated attribute information together with the information acquisition request to the information providing server 2 via the network NW. For example, when a user wants to search a restaurant existing (is located) in a direction from the current position, the user designates a word of restaurant as attribute information and then shakes the portable terminal 1 toward the direction.

On the other hand, when receiving the position information, the direction information, the acceleration information and the information acquisition request transmitted from the portable terminal 1 via the network NW (step S4), the system control unit 23 in the information providing server 2 determines a start point based on the position information, determines a direction based on the direction information, and determines a distance based on an acceleration indicated in the acceleration information (step S5). Herein, the start point is determined by the longitude and the latitude displayed in the position information, for example. The direction is determined by a direction indicated in the direction information, for example. The distance is determined by an acceleration indicated in the acceleration information with reference to a table predefining a correspondence between the acceleration and the distance or by the equations predefining a correspondence between the acceleration and the distance, for example. When the portable terminal 1 is quickly shaken by the user, the acceleration is expanded and thus the distance is made longer than when the portable terminal is slowly shaken. A maximum value (4.0, for example) of the acceleration specified in the portable terminal 1 and a maximum value of the distance corresponding to the maximum value of the acceleration are preset by the system control unit 23.

Then, the system control unit 23 determines (calculates) an information acquisition point based on the determined start point, the direction and the distance (step S6). For example, the information acquisition point is determined by the longitude and the latitude of the point located at the determined distance in the determined direction from the determined start point.

Figure 5:
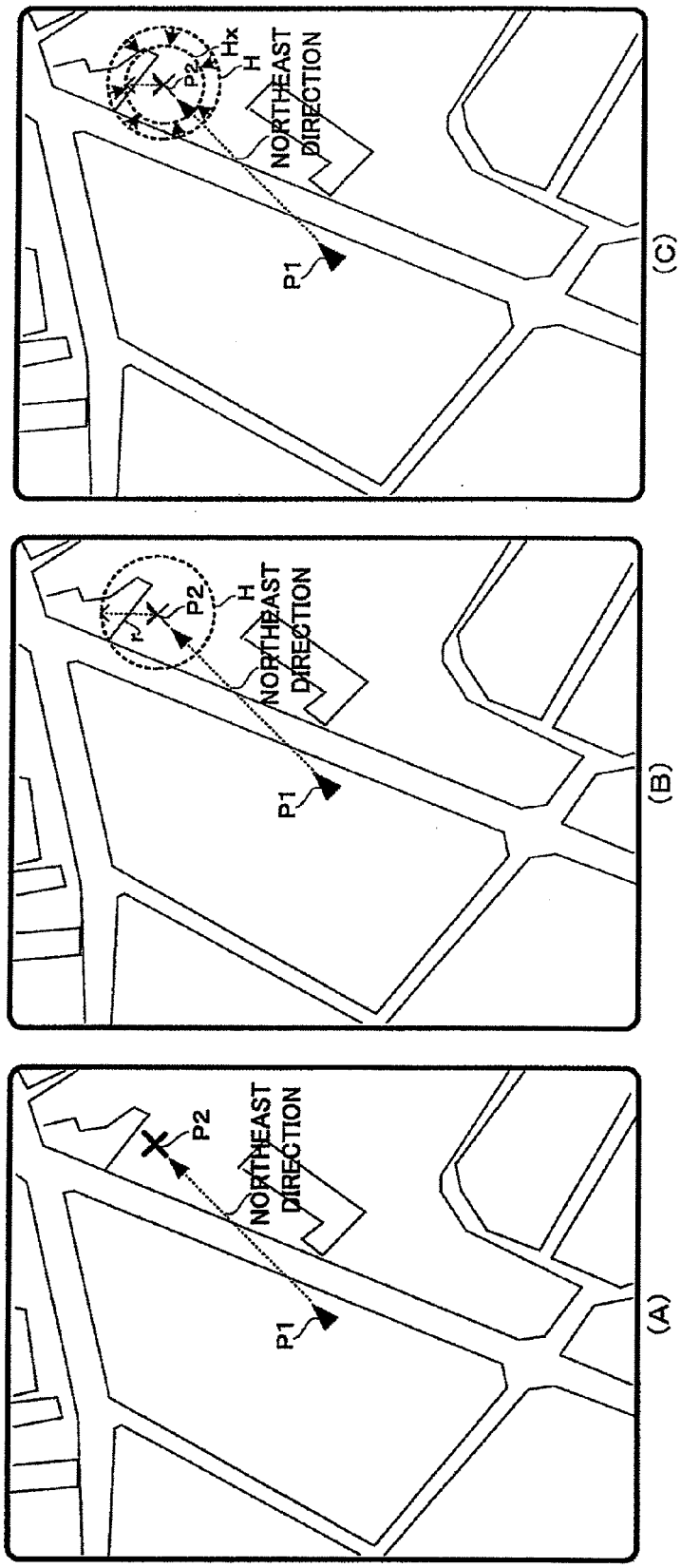
FIG. 5 is a diagram showing an exemplary position relationship between the start point and the information acquisition point.

FIG. 5 is a diagram showing an exemplary position relationship between the start point and the information acquisition point. In the example shown in FIG. 5(A), the information acquisition point P2 is determined in the northeast of the current position (start point) P1 of the user holding the portable terminal 1.

The system control unit 23 specifies a type of the determined information acquisition point with reference to the map data registered in the map database 221, for example, in step S6, and when the information acquisition point is sea, redetermines a harbor nearest to the point as an information acquisition point. Alternatively, in this case, the system control unit 23 may redetermine a position which is in a reverse direction to the determined direction by twice the distance between the determined information acquisition point (at sea) and the land (that is, a point which is backward from the information acquisition point to the start point) as an information acquisition point, for example. Alternatively, in this case, the system control unit 23 may transmit a message to promote the portable terminal 1 to be shaken in a desired direction to the portable terminal 1 and then terminate the processing.

The system control unit 23 determines an information extraction range based on the determined information acquisition point (step S7). For example, as shown in FIG. 5(B), a range (circular range) within a radius r (10 m, for example), which is preset about the information acquisition point P1, is determined as an information extraction range (a range specified by the longitude and the latitude, for example) H.

When the information providing server 2 receives the second acceleration information from the portable terminal 1, the system control unit 23 determines the information extraction range based on the received second acceleration information. For example, the radius corresponding to the second acceleration indicated in the second acceleration information is specified and the information extraction range according to the specified radius is determined with reference to the table predefining a correspondence between the acceleration and the radius or by the equations predefining a correspondence between the acceleration and the radius. Since when the portable terminal 1 is quickly shaken by the user, the acceleration is expanded, the information extraction range is further expanded (the area is expanded) than when the portable terminal is slowly shaken. Thus, the user can arbitrarily adjust the size of the information extraction range according to the speed at which he/she shakes the portable terminal 1. The information extraction range is not limited to a circular one and may be rectangular.

Then, the system control unit 23 extracts the provision information (information element) corresponding to the position in the determined information extraction range from the provision information database 222 (step S8). That is, the system control unit 23 extracts the provision information for which the position information is included in the information extraction range with reference to the position information associated with each item of provision information registered in the provision information database 222.

When the information providing server 2 receives attribute information from the portable terminal 1, the system control unit 23 extracts the provision information including the received attribute information from the provision information database 222. That is, the system control unit 23 makes a search with the received attribute information as a keyword, and extracts the provision information including the keyword from the provision information database 222. For example, when the user designates a word of restaurant as attribute information, shop information or coupon information including the word of restaurant is extracted from among the shop information or coupon information provided by the shops existing within the information extraction range. Thereby, the user can arbitrarily designate an attribute of the provision information to be browsed.

Then, the system control unit 23 determines whether the number of items of extracted provision information is a preset upper limit value (10, for example) or more (step S9). When determining that the number of items of extracted provision information is the upper limit value or more (step S9: YES), the system control unit 23 reduces the set size of the determined information extraction range (step S10) and returns to step S8. For example, when it is assumed that the information extraction range H is circular, the system control unit 23 redetermines the range Hx whose radius is reduced by a predetermined rate (30%, for example) as the information extraction range as shown in FIG. 5(C). Thereby, it is possible to avoid the fact that too much provision information is provided to the user (that the information is difficult to quickly browse). Thus, the number of items of provision information to be presented to the user can be adjusted to be proper.

On the other hand, when determining that the number of items of extracted provision information is not the upper limit value or more (step S9: NO), the system control unit 23 proceeds to step S11.

In step S11, the system control unit 23 determines whether the number of items of extracted provision information is a preset lower limit value (0, for example) or less. When determining that the number of items of extracted provision information is the lower limit value or less (step S11: YES), the system control unit 23 expands (increases) the size of the determined information extraction range (step S12) and returns to step S8. For example, when it is assumed that the information extraction range is circular, the system control unit 23 redetermines the range whose radius is expanded by a predetermined rate (20%, for example) as the information extraction range. Thereby, it is possible to avoid the fact that no or less provision information to be provided to the user is present. Thus, the number of items of provision information to be presented to the user can be adjusted to be proper.

On the other hand, when determining that the number of items of extracted provision information is not the lower limit value or less (step S11: NO), the system control unit 23 proceeds to step S13.

With the processings in steps S9 to S12, the size of the information extraction range is changed based on the number of items of provision information extracted in step S8.

When the condition is not met even if step S9 or step S11 is performed predetermined times, the system control unit 23 may retransmit a message to promote the portable terminal 1 to be shaken in a desired direction to the portable terminal 1 and may terminate the processing.

In step S13, the system control unit 23 transmits the extracted provision information (information element) to the portable terminal 1 having made the information acquisition request via the communication unit 21 and the network NW.

On the other hand, the control unit 18 in the portable terminal 1 receives the provision information transmitted from the information providing server 2 (the information element transmitted from the information providing server 2 in response to the transmitted information) (step S14), and displays the received provision information on the touch panel 16 (step S15). Thereby, the user can browse the displayed provision information.

As described above, according to the embodiment, when receiving the position information, the direction information, the acceleration information and the information acquisition request, which are acquired in the portable terminal 1, from the portable terminal 1, the information providing server 2 determines a start point based on the position information, determines a direction based on the direction information, determines a distance based on the acceleration information, and determines an information extraction range based on the determined start point, direction and distance. There is configured such that the information providing server 2 extracts the provision information corresponding to the position within the determined information extraction range from the provision information database 222, and provides the provision information to the portable terminal 1. Thus, even when the user of the portable terminal 1 has not determined a destination place yet, the provision information of facilities existing (are located) in a rough direction and at a rough distance from the user's current position can be efficiently acquired and presented to the user in the portable terminal 1. Since the user of the portable terminal 1 can acquire special pricing coupon information, for example, when he/she wants to go somewhere, which can motivate the user, the provider of the coupon information can guide the user to its shop or the like.

In the embodiment, the provision information transmitted to the portable terminal 1 may be displayed at the position corresponding to the provision information on the map area (such as surrounding area including the current position) displayed on the touch panel 16. The map area is changed (that is, the scaling is changed) by a user's operation on the touch panel 18. In this case, it is more effective that the portable terminal 1 transmits the area information (map scaling information, for example) on the map area displayed on the touch panel 18 to the information providing server 2 and the information providing server 2 having received the area information changes a correspondence between the acceleration and the distance based on the area information.

Figure 6:
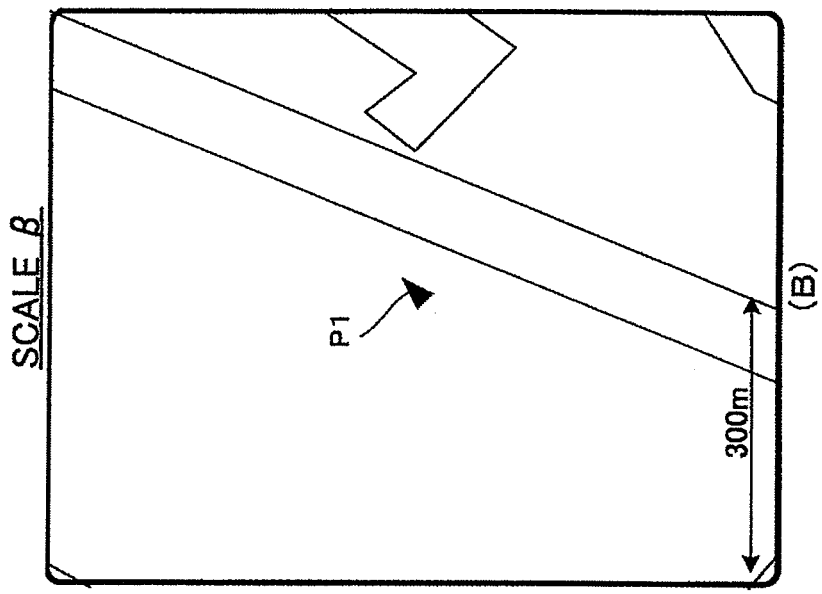
FIG. 6 is a diagram showing an exemplary map area displayed on the touch panel 18 of the portable terminal 1.
Figure 6:
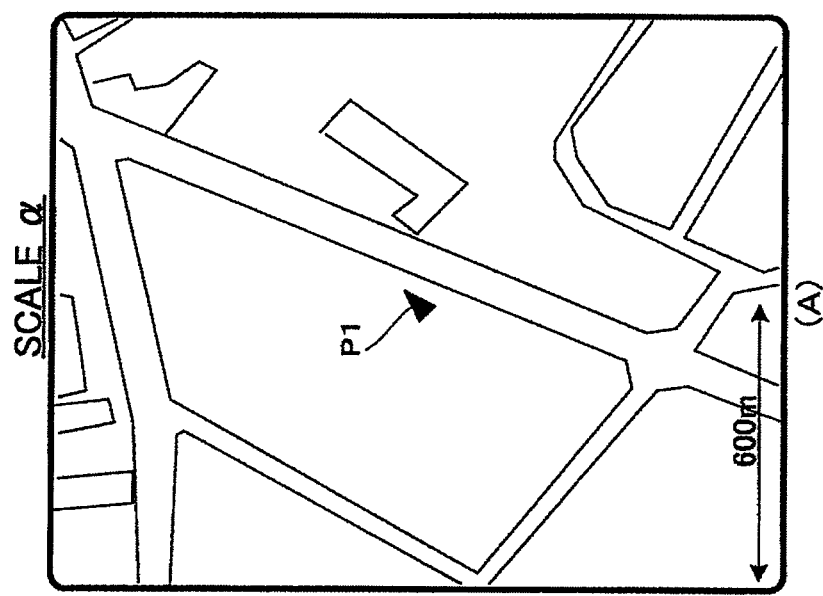

FIG. 6 is a diagram showing an exemplary map area displayed on the touch panel 18 of the portable terminal 1. FIG. 6(A) shows an exemplary display of the map area at a SCALE α and FIG. 6(B) shows an exemplary display of the map area at a SCALE β.

When the information providing server 2 receives the area information from the portable terminal 1, the system control unit 23 sets a maximum value of the distance, which is to be determined based on the acceleration information, based on the received area information. In the example shown in FIG. 6(A), the maximum value of the acceleration is set at "4.0" and the maximum value of the distance based on the area information is set at "600 m." On the other hand, in the example shown in FIG. 6(B), the maximum value of the acceleration is set at "4.0" and the maximum value of the distance based on the area information is set at "300 m." The system control unit 23 determines the distance corresponding to the acceleration indicated in the acceleration information received in step S4 based on the maximum value of the acceleration and the maximum value of the distance as set above in step S5. According to above configurations, the user can search a facility or the like within the range of the map area currently displayed on the portable terminal 1 and can browse the provision information. That is, since even when the maximum acceleration is specified in the portable terminal 1, a facility to be searched is not out of the currently-displayed map area, it is possible to avoid a complicated processing of scrolling the map area for browsing.

The embodiment may be configured such that the control unit 18 in the portable terminal 1 transmits the position information, the direction information and the information acquisition request except for the acceleration information to the information providing server 2. In this case, the system control unit 23 in the information providing server 2 determines a start point based on the position information, determines a direction based on the direction information, and determines an information extraction range based on the determined start point and direction. For example, the information extraction range is a sectoral area at ± a predetermined angle (5 degrees, for example) with reference to the line extending from the determined start point in the determined direction. The length of the line may be preset (100 m to 500 m, for example), or may be arbitrarily set by the user of the portable terminal 1. According to above configuration, even when the acceleration information is not used, the user of the portable terminal 1 can efficiently acquire the provision information of facilities and the like existing in a rough direction from the user's current position on the portable terminal 1 to be presented.

The embodiment may be configured such that the control unit 18 in the portable terminal 1 transmits the direction determination information (such as the second position information) other than the direction information to the information providing server 2. In this case, the information providing server 2 determines a start point based on the position information, determines a direction from a first point (start point) toward a second point (end point) based on the direction determination information, and determines an information extraction range based on the determined start point and direction.

The embodiment may be configured such that the control unit 18 in the portable terminal 1 transmits the distance determination information (such as the first time information and the second time information) other than the acceleration information to the information providing server 2. In this case, the information providing server 2 determines a start point based on the position information, determines a direction based on the direction determination information, determines a distance based on the distance determination information, and determines an information extraction range based on the determined start point, direction and distance. For example, the distance is determined as in step S5 based on the acceleration (the above second acceleration may be similarly calculated) obtained by dividing the speed (calculated by the portable terminal 1 or the information providing server 2), which is calculated by the distance between the first position and the second position (calculated by the portable terminal 1 or the information providing server 2) and the time between the first time and the second time (calculated by the portable terminal 1 or the information providing server 2), by the time between the first time and the second time.

EXPLANATION OF REFERENCE NUMERALS

1 Portable terminal
2 Information providing server
11 Communication unit
12 Storing unit
13 GPS receiver
14 Direction specifying means
15 Acceleration specifying means
16 Touch panel
17 Speaker
18 Control unit
21 Communication unit
22 Storing unit 23 System control unit
NW Network
S Information providing system

The invention claimed is:

1. A server apparatus comprising:
an information acquisition request receiving unit that receives acceleration information indicating an acceleration when a user shakes a portable terminal device toward a direction in which the user desires to acquire information, direction information indicating the direction, position information indicating a position of the portable terminal device, and an information acquisition request from the portable terminal device via a communication means;
an information extraction range determining unit that determines an information extraction range based on the received acceleration information, the direction information and the position information;
a providing information extracting unit that extracts providing information corresponding to a position within the determined information extraction range from a providing information storing unit that stores the providing information to be provided to the user of the portable terminal device in association with position information; and
a providing information transmitting unit that transmits the extracted providing information to the portable terminal device having made the information acquisition request via the communication means.

2. The server apparatus according to claim 1, wherein the direction in which the user desires to acquire information is a direction in which a reference position of the portable terminal device faces.

3. The server apparatus according to claim 1, wherein the information extraction range determining unit determines a range including a point in a direction indicated by the direction information and at a distance based on an acceleration indicated in the acceleration information from a position indicated by the position information as the information extraction range.

4. The server apparatus according to claim 1, further comprising:
an information extraction range changing unit that changes a size of the information extraction range based on the number of items of provision information corresponding to a position within the information extraction range.

5. The server apparatus according to claim 1, wherein the information acquisition request receiving unit receives second acceleration information indicating a second acceleration specified in the portable terminal device from the portable terminal device within a predetermined time after an initial acceleration is specified in the portable terminal device, and
the information extraction range determining unit further determines the information extraction range based on the received second acceleration information.

6. The server apparatus according to claim 5, wherein a direction of the initial acceleration is different from a direction of the second acceleration.

7. The server apparatus according to claim 3, in which the information acquisition request receiving unit receives area information on an area displayed on a displaying unit in the portable terminal device from the portable terminal device, further comprising:
a maximum acceleration setting unit that sets a maximum value of an acceleration to be specified;
a maximum distance setting unit that sets a maximum value of a distance, which is to be determined based on the acceleration information, based on the area information, and
a distance determining unit determines the distance corresponding to an acceleration indicated in the received acceleration information based on the set maximum value of the acceleration and the set maximum value of the distance.

8. The server apparatus according to claim 1, wherein the provision information includes attribute information,
the information acquisition request receiving unit receives attribute information designated by the user in the portable terminal device from the portable terminal device, and
the provision information extracting unit extracts the provision information including the received attribute information from the provision information storing unit.

9. An information providing method comprising:
a step of, at a server apparatus, receiving acceleration information indicating an acceleration when a user shakes a portable terminal device toward a direction in which the user desires to acquire information, direction information indicating the direction, position information indicating a position of the portable terminal device, and an information acquisition request from the portable terminal device via a communication means;
a step of, at the server apparatus, determining an information extraction range based on the received acceleration information, the direction information and the position information;
a step of, at the server apparatus, extracting provision information corresponding to a position within the determined information extraction range from a provision information storing unit that stores the provision information to be provided to the user of the portable terminal device in association with position information; and
a step of, at the server apparatus, transmitting the extracted provision information to the portable terminal device having made the information acquisition request via the communication means.

10. An information providing system comprising a portable terminal device and a server apparatus to which the portable terminal device is accessible via a communication means,
wherein the portable terminal device comprises:
a position information acquiring unit that acquires position information indicating a position of the portable terminal device;
a information acquiring unit that acquires acceleration information indicating an acceleration when a user shakes a portable terminal device toward a direction in which the user desires to acquire information, direction information indicating the direction, position information indicating a position of the portable terminal device; and
an information acquisition request transmitting unit that transmits the acquired acceleration information, the direction information, the position information and the information acquisition request to the server apparatus via a communication means, and
the server apparatus comprises:
an information acquisition request receiving unit that receives the transmitted acceleration information, the direction information, the position information and the information acquisition request;

an information extraction range determining unit that determines an information extraction range based on acceleration information, the direction information and the position information;
a provision information extracting unit that extracts provision information corresponding to a position within the determined information extraction range from a provision information storing unit that stores the provision information to be provided to the user of the portable terminal device in association with position information; and
a provision information transmitting unit that transmits the extracted provision information to the portable terminal device having made the information acquisition request via the communication means.

11. The information providing system according to claim 10, wherein the direction in which the user desires to acquire information is a direction in which a reference position of the portable terminal device faces.

12. The information providing system according to claim 10, wherein the information extraction range determining unit determines a range including a point in a direction indicated by the direction information and at a distance based on an acceleration indicated in the acceleration information from a position indicated by the position information as the information extraction range.

13. A portable terminal device comprising:
a information acquiring unit that acquires acceleration information indicating an acceleration when a user shakes a portable terminal device toward a direction in which the user desires to acquire information, direction information indicating the direction, position information indicating a position of the portable terminal device;
an information acquisition request transmitting unit that transmits the acquired acceleration information, the direction information, the position information and the information acquisition request to the server apparatus via a communication means;
a receiving unit that receives providing information transmitted from the server apparatus in response to the information transmitted by the information acquisition request transmitting unit, the providing information is extracted by the server apparatus from a providing information storing unit that stores providing information in association with position information, on the basis of position information within an information extraction range determined based on the acceleration information, the direction information and the position information; and
a displaying unit that displays the received providing information.

14. The portable terminal device according to claim 13, wherein the direction in which the user desires to acquire information is a direction in which a reference position of the portable terminal device faces.

15. The server apparatus according to claim 2, wherein the information extraction range determining unit determines a range including a point in a direction indicated by the direction information and at a distance based on an acceleration indicated in the acceleration information from a position indicated by the position information as the information extraction range.

16. The server apparatus according to claim 2, further comprising:
an information extraction range changing unit that changes a size of the information extraction range based on the number of items of provision information corresponding to a position within the information extraction range.

17. The server apparatus according to claim 2, wherein the information acquisition request receiving unit receives second acceleration information indicating a second acceleration specified in the portable terminal device from the portable terminal device within a predetermined time after an initial acceleration is specified in the portable terminal device, and
the information extraction range determining unit further determines the information extraction range based on the received second acceleration information.

18. The server apparatus according to claim 17, wherein a direction of the initial acceleration is different from a direction of the second acceleration.

19. The server apparatus according to claim 15, in which the information acquisition request receiving unit receives area information on an area displayed on a displaying unit in the portable terminal device from the portable terminal device, further comprising:
a maximum acceleration setting unit that sets a maximum value of an acceleration to be specified;
a maximum distance setting unit that sets a maximum value of a distance, which is to be determined based on the acceleration information, based on the area information, and
a distance determining unit determines the distance corresponding to an acceleration indicated in the received acceleration information based on the set maximum value of the acceleration and the set maximum value of the distance.

20. The server apparatus according to claim 2, wherein the provision information includes attribute information,
the information acquisition request receiving unit receives attribute information designated by the user in the portable terminal device from the portable terminal device, and
the provision information extracting unit extracts the provision information including the received attribute information from the provision information storing unit.

21. The server apparatus according to claim 6, wherein the provision information includes attribute information,
the information acquisition request receiving unit receives attribute information designated by the user in the portable terminal device from the portable terminal device, and
the provision information extracting unit extracts the provision information including the received attribute information from the provision information storing unit.

22. The server apparatus according to claim 18, wherein the provision information includes attribute information,
the information acquisition request receiving unit receives attribute information designated by the user in the portable terminal device from the portable terminal device, and
the provision information extracting unit extracts the provision information including the received attribute information from the provision information storing unit.

23. The server apparatus according to claim 7, wherein the provision information includes attribute information,
the information acquisition request receiving unit receives attribute information designated by the user in the portable terminal device from the portable terminal device, and
the provision information extracting unit extracts the provision information including the received attribute information from the provision information storing unit.

24. The server apparatus according to claim 19, wherein the provision information includes attribute information,
  the information acquisition request receiving unit receives attribute information designated by the user in the portable terminal device from the portable terminal device, and
  the provision information extracting unit extracts the provision information including the received attribute information from the provision information storing unit.

25. The information providing system according to claim 11, wherein the information extraction range determining unit determines a range including a point in a direction indicated by the direction information and at a distance based on an acceleration indicated in the acceleration information from a position indicated by the position information as the information extraction range.

\* \* \* \* \*